United States Patent Office.

OTTO JENSEN AND RUDOLF KECK, OF COLORADO SPRINGS, COLORADO.

COMPOSITION OF GLASS.

SPECIFICATION forming part of Letters Patent No. 494,636, dated April 4, 1893.

Application filed October 4, 1892. Serial No. 447,823. (No specimens.)

*To all whom it may concern:*

Be it known that we, OTTO JENSEN and RUDOLF KECK, citizens of the United States, residing at Colorado Springs, in the county of El Paso and State of Colorado, have invented certain new and useful Improvements in the Composition of Glass, of which the following is a specification.

Heretofore in the manufacture of glass an expensive item has been the English soda used as a base. We have discovered that by using a rock termed "phonolite," which contains considerable alkalies, instead of quartz sand, an addition of carbonate of soda can be entirely dispensed with. Phonolite is found in considerable quantities in our country, and it consists more or less of sixty per cent. of silica, twenty per cent. of alumina, and fourteen to fifteen per cent. of potassa and soda. German green glass, which until recently could not be made in the United States, is made by the addition of an average of twenty-two per cent. of limestone to the rock "phonolite." Light green or light amber glass for window glass or fruit jars requires with the rock an average of forty per cent. of sulphate of soda and two per cent. of saltpeter. The use of this rock "phonolite" for bottle glass, enables the manufacture of a very strong glass adapted to stand the strong pressure that champagne, mineral and soda-water bottles are subjected to. A more fluid glass than the above-described may be obtained by mixing the rock with ten to twenty-two per cent. of natural sulphate of sodium. Of course limestone has to be mixed with the rock, twenty to thirty per cent.

What we claim is—

1. A glass composition consisting of the rock "phonolite" and limestone.

2. A glass composition consisting of the rock "phonolite," sulphate of sodium, and limestone.

In testimony whereof we affix our signatures in presence of two witnesses.

OTTO JENSEN.
RUDOLF KECK.

Witnesses:
C. B. WIDER,
CHAS. G. COLLAIS.